United States Patent [19]

Gray, Jr. et al.

[11] Patent Number: 4,679,682
[45] Date of Patent: Jul. 14, 1987

[54] MARINE DRIVE SHIFT MECHANISM WITH DETENT CANISTER CENTERED NEUTRAL

[75] Inventors: Charles F. Gray, Jr.; Gary L. Meisenburg, both of Fond du Lac; Alvin Zemlicka, Sheboygan, all of Wis.

[73] Assignee: Brunswick Corporation, Skokie, Ill.

[21] Appl. No.: 897,627

[22] Filed: Aug. 18, 1986

[51] Int. Cl.⁴ .................. F16D 21/04; F16D 23/14; F16H 3/14
[52] U.S. Cl. ................................. 192/21; 192/51; 192/93 R; 74/378; 74/475
[58] Field of Search .................. 192/20, 21, 51, 67 R, 192/89 A, 93 C, 94; 74/507, 509, 470, 504, 333, 355, 378, 475

[56] References Cited

U.S. PATENT DOCUMENTS

| | | |
|---|---|---|
| 2,639,015 | 5/1953 | Wolf .................................. 192/93 C |
| 3,269,497 | 8/1966 | Bergstedt .............................. 192/51 |
| 4,244,454 | 1/1981 | Bankstahl . |
| 4,257,506 | 3/1981 | Bankstahl . |
| 4,278,156 | 7/1981 | Yano et a. .......................... 192/51 X |
| 4,527,441 | 7/1985 | Nakahama ............................. 74/378 |
| 4,570,776 | 2/1986 | Iwashita et al. .................. 74/475 X |

*Primary Examiner*—George H. Krizmanich
*Attorney, Agent, or Firm*—Andrus, Sceales, Starke & Sawall

[57] ABSTRACT

A marine drive (10) is provided with a shift mechanism (200) including a detent canister assembly (202). A cylindrical canister (204) contains a ball (206) biased by a pair of concentric springs (208 and 210) into engagement with a shifter lever arm (124) to center the latter in a neutral position. The canister assembly (202) is a self-contained modular unit inserted into the marine drive housing (23). The cylindrical canister (204) has a left end wall (214) with an aperture (216) therethrough and has an open right end containing the ball (206). The first spring bears (208) at its right end against the ball (206) and extends axially leftwardly through the aperture (216) in the left end wall (214) of the canister (204) and bears at its left end against the housing (23). The second outer concentric spring (210) bears at its right end against the ball (206) and is entirely within the canister (204) and bears at its left end against the left end wall (214) of the canister (204). Upon axial leftward depression of the ball (206) by the shift lever arm (124), the first inner spring (208) compresses and the canister (204) moves axially leftwardly until the left wall (214) of the canister (204) strikes the housing wall (218) to close a tolerance-accommodating gap (220), whereafter both springs (208 and 210) compress during further leftward depression of the ball (206). Particular constructional details of the shift lever arm (124) are also disclosed.

14 Claims, 7 Drawing Figures

MARINE DRIVE SHIFT MECHANISM WITH DETENT CANISTER CENTERED NEUTRAL

BACKGROUND AND SUMMARY

The invention relates to a marine drive gear shifting mechanism. The invention is particularly useful in the marine drive shift mechanism shown in application Ser. No. 765,326, filed Aug. 13, 1985 and U.S. Pat. No. 4,630,719. In this type of drive, an axially movable central clutch sleeve element is supported for rotation with a main shaft and positioned between forward and reverse gears each having a clutch face, for which further reference may be had to Bankstahl U.S. Pat. Nos. 4,244,454 and 4,257,506.

The present invention provides a detent centered neutral position with a detent canister assembly which is particularly cost effective and accommodates existing tolerance deviations in the marine drive housing, without requiring expensive close-tolerance specifications. The invention further provides a detent canister assembly which is a self-contained modular unit inserted into the marine drive housing without the need for special assembly steps or sequences.

A detent mechanism is described in the above noted Bankstahl U.S. Pat. No. 4,244,454 at column 3, lines 28–34, and in Bankstahl U.S. Pat. No. 4,257,506 at column 3, lines 25–31.

DETAILED DESCRIPTION

Figure 1:
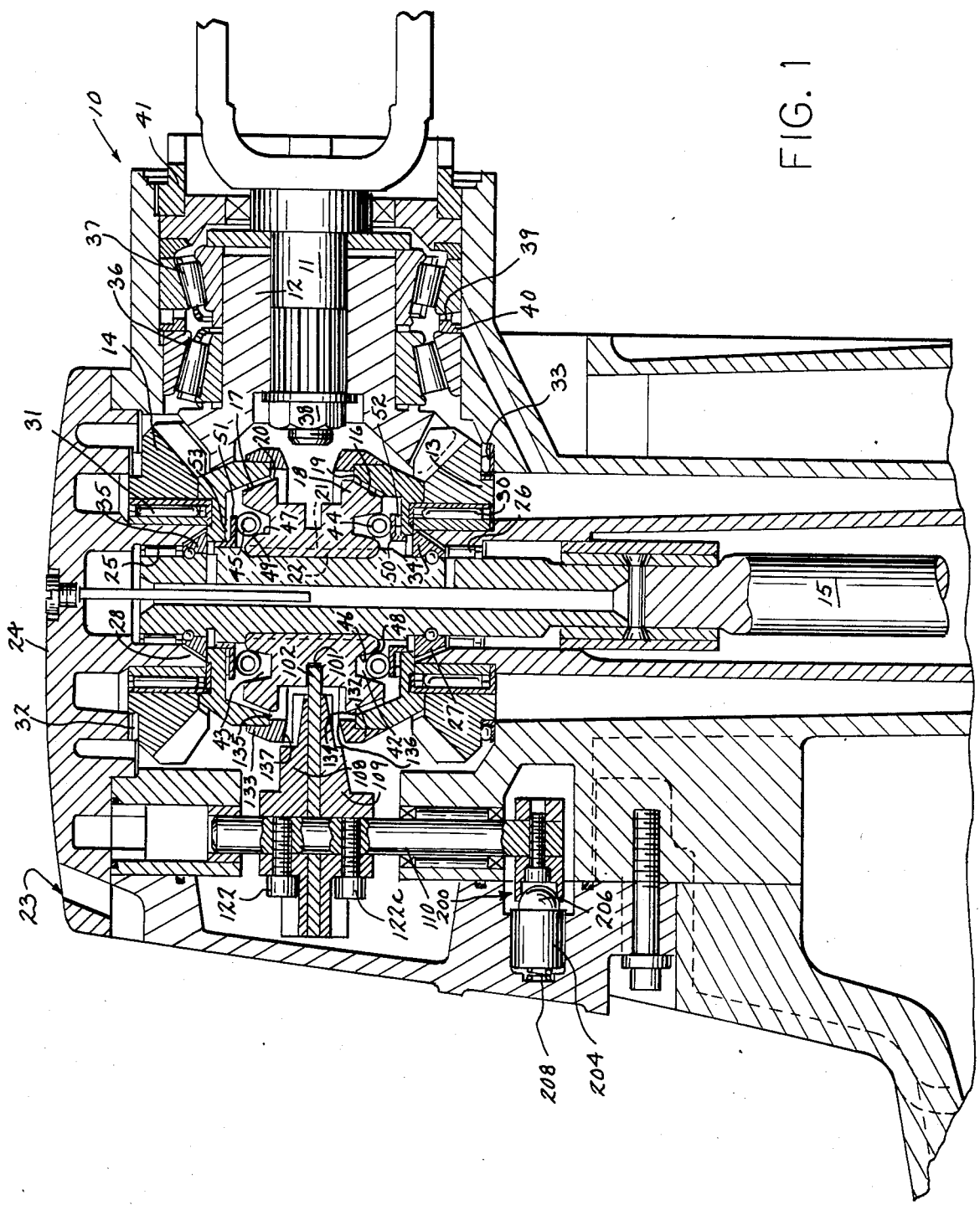
FIG. 1 is a side view in section of the upper portion of a marine stern drive showing the shifting mechanism with detent canister assembly in accordance with the invention.

FIG. 1 shows the upper portion of a marine stern drive unit 10, for which further reference may be had to above noted Application Ser. No. 765,326 and to the above noted U.S. Pat. Nos. 4,244,454 and 4,257,506, all incorporated herein by reference. The structure in FIG. 1 which is common with these references will be only briefly described, and like reference numerals are used where appropriate to facilitate clarity. As is well known in such arrangements, an input shaft 11 carries an input bevel gear 12 which drives the counter-rotating forward bevel gear 13 and reverse bevel gear 14 which rotate about axial main shaft 15. The forward and reverse gears 13 and 14 each have an internal conical clutch surface 16, 17, attached by welding, facing each other. The main shaft 15 carries a sleeve member 18 between the clutch gears 13 and 14, the sleeve 18 having conical clutch faces 19 and 20 on each end for mating with the forward and reverse gears. The sleeve member 18 has internal helical splines 21 engaged with helical splines 22 on main shaft 15. When clutch sleeve 18 is engaged with either the forward or reverse gear 13 or 14, the helical splines 21 and 22 act to force the engaged clutch faces toward each other, thereby driving main shaft 15 in either forward or reverse. The main shaft 5 extends downwardly to drive a propeller, not shown.

Top cover 24 is attached to gear housing 23 by machine screws, not shown. Main shaft 15 is supported for rotation by the upper and lower main needle bearings 25 and 26 which are mounted on the inside of annular projections 27 and 28 extending from the top cover 24 and the lower housing, respectively. Mounted on the outside of the annular projections 27 and 28, in substantially the same plane as the main bearings and the gear teeth, are the forward and reverse gear needle bearings 30 and 31 which carry the forward and reverse clutch gears 13 and 14. Thrust bearings 32 and 33 are mounted on the housing to position the forward and reverse gears 13 and 14 and support the axial loads thereon. Thrust collars 34 and 35, fixed to main shaft 15, bear against outside surfaces of the forward and reverse gears 13 and 14. Input gear 12 is supported by bearings 36 and 37 which are axially loaded by nut 38 which attaches input shaft 11 to input gear 12. Between the bearings 36 and 37 is a collar 39 which serves to axially position the assembly against a surface 40 machined on gear housing 23. Threaded collar 41 forces collar 39 against the housing 23. Because the housing surfaces on which the bearings rest can be accurately machined, precise location of the forward and reverse gears 13 and 14 relative to the input bevel gear 12 is assured. This arrangement substantially eliminates forces that would tend to misalign the clutch faces, accurately positions the gears, thereby extending the useful life of the unit, and simplifies assembly of the drive unit components.

To provide a smooth, uniform shifting action, the clutch sleeve 18 has grooves 42 and 43 on each end with coil springs 44 and 45, acting as garter springs, placed in tension and circling the main shaft 15, within each groove 42 and 43. Each groove 42 and 43 has two cam surfaces on which the coil springs are supported. The axially inward cam surfaces 46 and 47 are sloped at twenty degrees to the axis of the main shaft, while the axially outward cam surfaces 48 and 49 are sloped at forty-five degrees. As a result, the coil springs 44 and 45 are always biased axially outward from the end grooves 42 and 43 to push against thrust plates 50 and 51 which in turn ride on bearings 52 and 53 which bear against forward and reverse gears 13 and 14. The intersections of the forty-five degree and twenty degree cam faces are placed to locate the coil springs 44 and 45 very nearly on the intersections when the clutch sleeve 18 is in the neutral position, half way between the forward and reverse gears 13 and 14.

When the clutch sleeve 18 is moved away from its neutral position, say toward the forward gear 13, one spring 45 will ride down onto its forty-five degree cam face 49 while the other spring 44 will ride onto its twenty degree cam face 46. As a result, the axial force produced by the one spring 45 will increase and the other will decrease, producing a net force to push the clutch sleeve 18 into engagement with the forward gear 14. The spring 44 riding on the twenty degree cam face 46 will act to provide a minimum axial load on the forward gear's thrust plate 50 while the spring 45 will provide an axial load to hold gear 14 in place. Thus a smooth, uniform shifting action will result, since substantially the same force will be applied to the clutch sleeve 18 every time it is shifted. Shifting to reverse is of course the converse of shifting to forward.

The structure described thus far is identical to that shown in the above noted Bankstahl U.S. Pat. Nos. 4,244,454 and 4,257,506.

Figure 2:
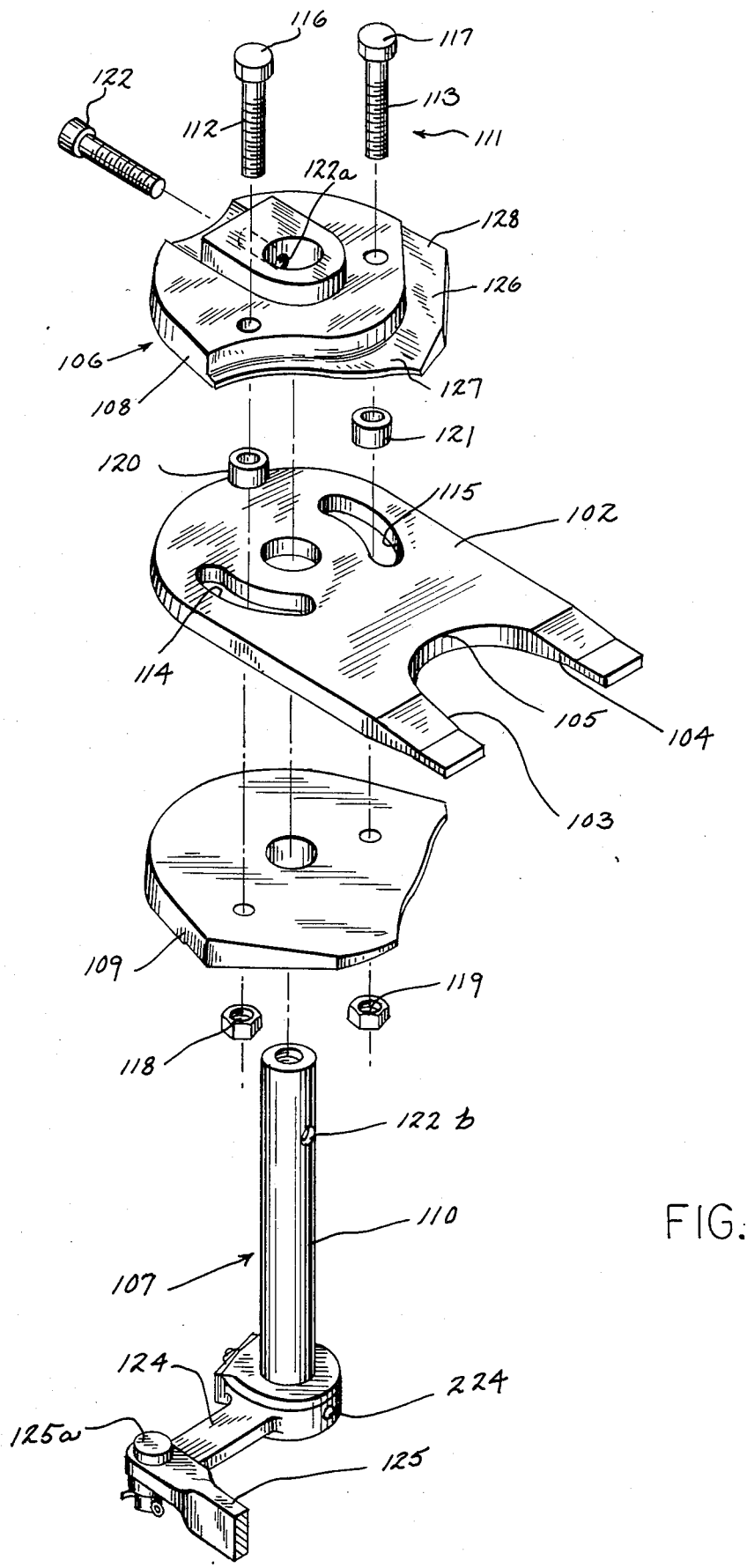
FIG. 2 is an exploded isometric view of a portion of FIG. 1.
Figure 3:
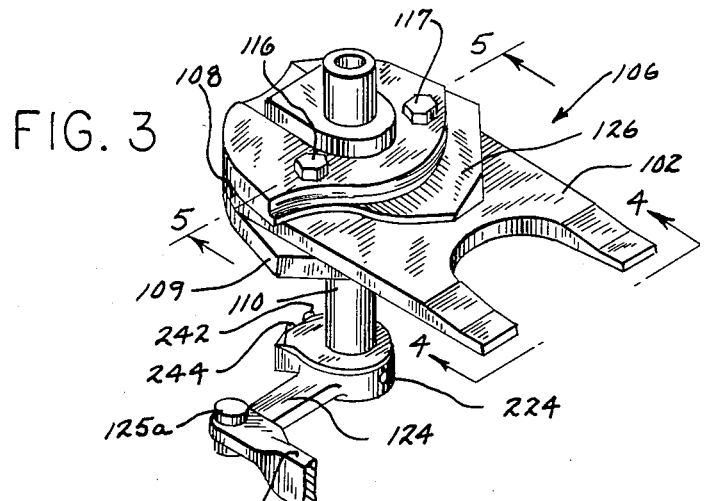
FIG. 3 is an assembled isometric view of the structure of FIG. 2.

Referring to FIGS. 1-3, clutch sleeve 18 has an exterior circumferential groove 101 axially between its conical clutch faces 19 and 20. A yoke 102 engages groove 101 for moving sleeve member 18 axially along shaft 15. Yoke 102, FIGS. 2 and 3, is a split fork with tines 103 and 104 and central portion 105 engaging groove 101. Cam means 106 is operatively associated with yoke 102, and actuating means 107 is provided for actuating cam means 106 into engagement with one of the forward or reverse gears 13 and 14 to actuate yoke 102 and drive sleeve member 18 into engagement with the other of the forward and reverse gears.

Cam means 106 comprises first and second cams 108 and 109 on opposite sides of yoke 102. First cam 108 faces reverse gear 14 thereabove. Second cam 109 faces forward gear 13 therebelow. Actuating means 107 comprises an axial shaft 110 parallel to main shaft 15 for rotating cams 108 and 109 relative to yoke 102 about an axis parallel to main shaft 15. Interconnection means 111 is provided for interconnecting cams 108 and 109 to each other to rotate in unison relative to yoke 102.

Interconnection means 111 includes attachment means such as axial bolts 112 and 113 extending through apertures 114 and 115 in yoke 102 and connected to each of cams 108 and 109, such as at enlarged heads 116 and 117 and nuts 118 and 119. Annular spacer sleeves 120 and 121 are provided around bolts 112 and 113 and extend through respective apertures 114 and 115 in yoke 102 and engage cams 108 and 109 at the axial ends of sleeves 120 and 121. Spacer sleeves 120 and 121 have a height or thickness slightly greater than the thickness of yoke 102 in order to space first and second cams 108 and 109 apart by a distance slightly greater than the thickness of yoke 102, which allows the first and second cams to rotate in unison relative to yoke 102 with minimal frictional retardation. Cam 108 is mounted to actuating rotary shaft 110 by set screw 122 extending through aperture 122a in cam 108 and received in threaded aperture 122b in shaft 110. A set screw may be provided for either or both of cams 108 and 109, for example as shown in FIG. 1 at 122 and 122c, though only a single set screw is needed because the cams are locked together by bolts 112 and 113 and rotate in unison.

Apertures 114 and 115 have an arcuate configuration defining an arc about a center at rotary shaft 10 through aperture 123 of the yoke. First and second cams 108 and 109 may thus rotate about the axis of shaft 110, without rotation of yoke 102 which remains in groove 101 of sleeve member 18. Rotary axial shaft 110 is operated through a lever arm 124 and linkage 125 pivotally mounted to arm 124 by a pivot pin 125a. Shaft 110 has a central neutral position and forward and reverse rotated positions on opposite sides of the neutral position. In the orientation in FIG. 2, clockwise rotation of shaft 110 provides the forward position, and counterclockwise rotation of shaft 110 provides the reverse position.

Figure 4:
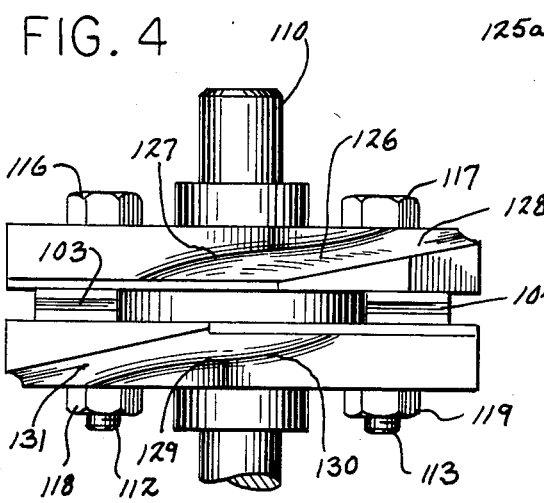
FIG. 4 is an end elevation view taken along line 4—4 of FIG. 3.
Figure 5:
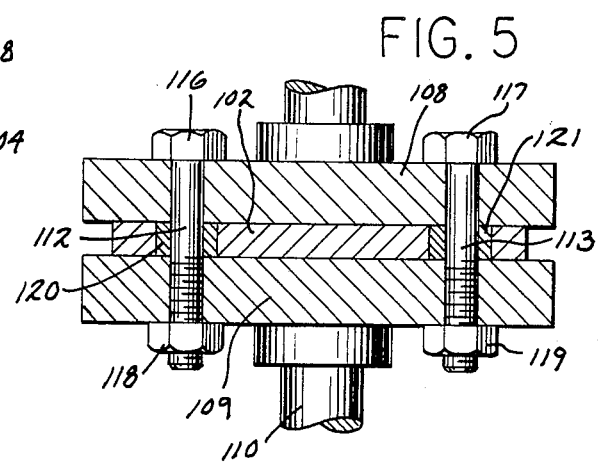
FIG. 5 is a sectional view taken along line 5—5 of FIG. 3.

Cam 108 has an arcuate tapered camming surface 126 having a reduced height portion 127 axially aligned with and spaced from reverse gear 14 thereabove when actuating means 107 is in the neutral position, and having an increased height portion 128 axially aligned with and engaging the reverse gear thereabove when actuating means 107 is rotated to the forward position, such that engagement of camming surface 126 of cam 108 with the reverse gear drives yoke 102 axially downwardly away from the reverse gear 14 and toward forward gear 13 to drive sleeve member 18 into engagement with the forward gear at conical clutch faces 19 and 16. Second cam 109 has a tapered arcuate camming surface 129, FIG. 4, having a reduced height portion 130 axially aligned with and spaced from the forward gear 13 therebelow when actuating means 107 is in the neutral position, and having an increased height portion 131 axially aligned with and engaging forward gear 13 when actuating means 107 is rotated to the reverse position, such that engagement of camming surface 129 of cam 109 with the forward gear drives yoke 102 axially upwardly away from the forward gear and toward the reverse gear 14 to drive sleeve member 18 into engagement with reverse gear 14 at conical clutch faces 20 and 17. Camming surfaces 126 and 129 of first and second cams 108 and 109 are oppositely tapered, with axially aligned reduced height portions 127 and 130, and offset increased height portions 128 and 131. Engagement of the respective tapered camming surfaces with the respective gear drives sleeve member 18 out of engagement with that gear such that torque applied to the cams 108 and 109 through the forward or reverse gear assists clutch disengagement of that gear such that requisite shift force decreases as torque increases.

The forward and reverse gears 13 and 14 include respective first and second annular rings 132 and 133 around facing circumferential edges 134 and 135 of the forward and reverse gears. In one form, brass rings 132 and 133 are pressfit onto the facing peripheral edges of the noted gears. The rings lie in a circumferential plane about main axial shaft 15. Each ring has an eccentric face surface 136 and 137 lying in the noted circumferential plane. Shift means, as above described, is provided by yoke 102, cams 108 and 109 and actuating means 107. Camming surface 126 of cam 108 is rotated into engagement with eccentric face surface 137 of ring 133 to actuate yoke 102 and drive sleeve member 18 axially downwardly out of engagement with reverse gear 14 and into engagement with forward gear 13 with a pulsed impact hammer effect due to the eccentricity of face surface 137 of ring 133 as it rotates in the noted circumferential plane about main shaft 15. The pulsed hammer effect disengagement of sleeve clutch 18 from reverse gear 14 further facilitates ease of shifting disengagement, in addition to the noted torque aided disengagement, such that the requisite disengagement shift force further decreases as engine speed and torque increases. In the other direction, camming surface 129 of cam 109 is rotated into engagement with eccentric face surface 136 of ring 132 to actuate yoke 102 and drive sleeve member 18 axially upwardly out of engagement with forward gear 13 and into engagement with reverse gear 14 with a pulsed impact hammer effect due to the eccentricity of face surface 136 of ring 132 as it rotates in the noted circumferential plane about main shaft 15. The pulsed hammer effect disengagment of sleeve clutch 18 from forward gear 13 further facilitates ease of shifting disengagement, in addition to the noted torque aided disengagement, such that the requisite disengagement shift force further decreases as engine speed and torque increases. Each of the eccentric face surfaces 136 and 137 is perferably machined to have a maximum height portion 180° offset from a minimum height portion to provide one impact on the respective cam per revolution of the respective gear means. The eccentric height differential of the annular circumferential surface is 0.026 inch.

The structure described thus far is identical to that shown in the above noted application Ser. No. 765,326.

Figure 6:
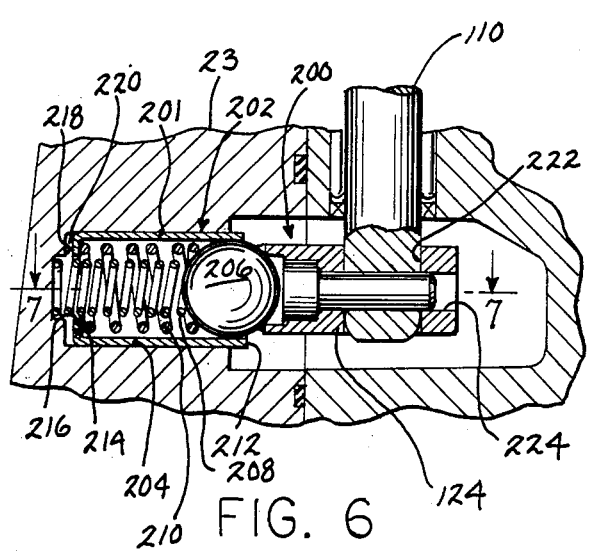
FIG. 6 is an enlarged view of a portion of FIG. 1.
Figure 7:
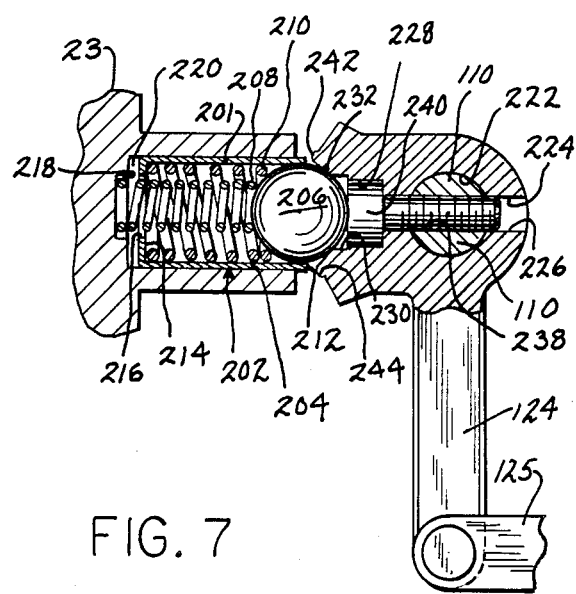
FIG. 7 is a sectional view taken along line 7—7 of FIG. 6.

Referring to FIGS. 6 and 7, there is shown a shift mechanism and detent canister assembly 200 at the bottom of shaft 110. Detent canister assembly 202 is a single modular unit mounted in a cylindrical cavity 201 in housing 23 and includes a cylindrical canister 204 containing a ball 206 and a pair of concentric compression springs 208 and 210 biasing ball 206 into engagement with shift means provided by lever 124 at the bottom of shaft 110 to center the latter in the neutral position.

Canister 204 is a cylindrical member having an open right end which is slightly crimped inwardly at 212 to trap and retain ball 206 and limit and stop the biased rightward movement of ball 206 to provide a self-contained modular unit 202. Canister 204 has a left end 214 with an aperture 216 therethrough through which first spring 208 extends. Each of springs 208 and 210 bears at its rightward end against ball 206. First spring 208 has a rightward portion within canister 204 and has a leftward portion extending through aperture 216 exteriorly of the canister and bearing at its other end against housing 23. Second spring 210 is concentric to spring 208 and bears at its left end against the left end wall 214 of the canister.

The left end 214 of canister 204 is spaced from housing wall 218 by a tolerance-accommodating gap 220. Upon axial leftward depression of ball 206, spring 208 compresses and canister 204 moves leftwardly along its axis until the left end wall 214 of the canister strikes housing wall 218 and closes gap 220. Upon further leftward depression of ball 206, both springs 208 and 210 compress. The canister 204 allows the center of ball 206 to move rightwardly beyond the opening of the cylindrical cavity 201 while restraining the ball 206 from lateral movement relative to the axis of the cylindrical cavity 201. Thus the effective travel of the detent ball 201 is extended to accommodate manufacturing tolerances.

Lever arm 124 has a first aperture 222 therethrough through which shaft 110 extends. Lever arm 124 has a second aperture 224 therethrough transverse to first aperture 222. Second aperture 224 has a step reduced diameter with a small inner diameter 226 interfacing with first aperture 222, a larger central diameter 228 and a yet larger leftward outer diameter 230 providing a shoulder 232 at the left outer edge of lever arm 124. A set screw 234 is inserted into aperture 224 and has a threaded lead portion 236 received in small diameter inner portion 226 and threaded into a threaded opening 238 in shaft 110 to thus mount lever arm 124 to shaft 110. The head 240 of set screw 234 is received in central diameter portion 228.

Ball 206 is received in leftward outer diameter portion 230 of aperture 224 and engages outer shoulder 232 of lever arm 124 to center the lever arm in the noted neutral position. Shoulder 232 on the outer edge of lever arm 124 is formed by the larger leftward outer diameter 230 and also includes a raised bump 242 and 244 on each side of the ball. When lever arm 124 rotates shaft 110 clockwise to the forward position, bump 244 moves across ball 206 depressing the latter and providing biased retention of lever arm 124 in the forward position after bump 244 moves past ball 206. When lever arm 124 is rotated counterclockwise to the reverse position, bump 242 moves across ball 206 depressing the latter and providing biased retention of lever arm 124 in the reverse position after bump 242 moves past ball 206.

It is recognized that various equivalents, alternatives and modifications are possible within the scope of the appended claims.

We claim:

1. In a marine drive having a housing with forward and reverse gear means and shift means having a forward position engaging said forward gear means and having a reverse position engaging said reverse gear means and having a neutral position disengaging said forward and reverse gear means, a detent canister assembly comprising a single modular unit mounted in said housing, said assembly comprising a cylindrical canister containing a ball and means biasing said ball into engagement with said shift means to center the latter in said neutral position.

2. The invention according to claim 1 comprising means retaining said ball in said cylindrical canister and limiting and stopping the biased movement of said ball to provide a self-contained said modular unit.

3. The invention according to claim 1 wherein said biasing means comprises a pair of concentric springs each bearing at one end against said ball, the first of said springs having a portion within said canister and having another portion extending exteriorly of said canister and bearing at its other end against said housing, the second of said springs being entirely within said canister and bearing at its other end against said canister.

4. The invention according to claim 3 wherein said ball is at one end of said cylindrical canister and said first spring extends exteriorly beyond the other end of said canister and wherein said other end of said canister is spaced from said housing by a given tolerance-accommodating gap, such that upon depression of said ball in said canister, said first spring compresses and said canister moves and closes said gap, and such that when said gap is closed and upon further depression of said ball in said canister, both said springs compress.

5. A marine drive shift mechanism comprising:
a housing;
a main shaft;
reverse gear means freely rotatable about said main shaft, said reverse gear means having a clutch face on one side;
forward gear means freely rotatable about said main shaft, said forward gear means having a clutch face on one side, with said clutch faces facing each other;
a drive gear meshed with said reverse and forward gear means for driving said reverse and forward gear means in respectively opposite directions of rotation;
a sleeve member mounted on said main shaft between said reverse and forward gear means, said sleeve member having a clutch face at each end, each clutch face selectively engageable with one of said clutch faces of said forward and reverse gear means;
shift means engaging and selectively moving said sleeve member along said main shaft into engagement with said gear means, said shift means having a forward position moving said sleeve member into engagement with said forward gear means, said shift means having a reverse position moving said sleeve member into engagement with said reverse gear means, said shift means having a neutral position moving said sleeve member to a position between and disengaged from said forward and reverse gear means;

a detent canister assembly mounted as a unit in said housing, said canister assembly comprising a cylindrical canister containing a spring biased ball biased into engagement with said shift means in detent relation to center the latter in said neutral position.

6. The invention according to claim 5 wherein said detent canister assembly comprises first and second springs, said first spring biasing said ball into engagement with said shift means in detent relation to center the latter in said neutral position, said second spring allowing biased movement of said canister relative to said housing to accommodate tolerance deviations in said housing.

7. The invention according to claim 6 wherein:
said cylindrical canister extends axially left-right and has a left end wall with an aperture therethrough and has an open right end;
said first spring extends axially through said aperture in said left end wall of said canister, said first spring having a left end bearing against said housing and having a right end bearing against said ball;
said second spring extends axially within said canister and is concentric to said first spring, said second spring having a left end bearing against said left end wall of said canister and having a right end bearing against said ball,
such that axial leftward depression of said ball by said shift means compresses said first spring and also moves said canister axially leftwardly until said left end wall of said canister strikes said housing stopping leftward movement of said canister, whereafter both said first and said second springs are compressed during further leftward depression of said ball.

8. The invention according to claim 7 wherein said right end of said canister is crimped radially inwardly to trap and retain said ball within said canister as a self-contained unit and to limit and stop the biased rightward movement of said ball.

9. A marine drive shift mechanism comprising:
a housing;
a main shaft;
reverse gear means freely rotatable about said main shaft, said reverse gear means having a clutch face on one side;
forward gear means freely rotatable about said main shaft, said forward gear means having a clutch face on one side, with said clutch faces facing each other;
a drive gear meshed with said reverse and forward gear means for driving said reverse and forward gear means in respectively opposite directions of rotation;
a sleeve member mounted on said main shaft between said forward and reverse gear means, said sleeve member having a clutch face at each end, each clutch face selectively engagable with one of said clutch faces of said reverse and forward gear means;
shift means for engaging and selectively moving said sleeve member along said main shaft into engagement with said gear means, said shift means having a forward position moving said sleeve member into engagement with said forward gear means, said shift means having a reverse position moving said sleeve member into engagement with said reverse gear means, said shift means having a neutral position moving said sleeve member to a position between and disengaging said forward and reverse gear means, said shift means comprising yoke means for engaging and moving said sleeve member and actuating linkage for actuating said yoke means, said actuating linkage including a rotary shaft extending parallel to said main shaft, and a lever arm mounted to said second mentioned shaft;
a detent canister assembly mounted in said housing and containing a spring biased ball engaging said lever arm to center the latter in said neutral position of said shift means.

10. The invention according to claim 9 wherein said lever arm has a first aperture therethrough through which said second shaft extends and has a second aperture transverse to said first aperture, said second aperture having a step reduced diameter with a small inner diameter interfacing with said first aperture, said second aperture having an outer larger diameter providing a shoulder at the outer edge of said lever arm, said second shaft has a transverse threaded opening therein, and comprising a set screw inserted in said second aperture in said lever arm and received in said small diameter inner portion thereof and threaded into said threaded opening in said second shaft inserted into said first aperture in said lever arm, and wherein said ball in said detent canister assembly engages said outer shoulder of said lever arm formed by said larger outer diameter of said second aperture to center said lever arm in said neutral position.

11. The invention according to claim 10 wherein said shoulder on said outer edge of said lever arm formed by said larger outer diameter of said second aperture comprises a raised bump on each side of said ball such that when said shift means moves to said forward position, said lever arm rotates about the axis of said second shaft and moves one of said bumps across said ball depressing the latter and providing biased retention of said lever arm in said forward position after said one bump moves past said ball, and such that when said shift means is moved to said reverse position said lever arm rotates about the axis of said second shaft and moves the other bump across said ball depressing said ball and providing biased retention of said lever arm in said reverse position after said other bump moves past said ball.

12. A marine drive shift mechanism comprising:
a housing;
a main shaft;
reverse gear means freely rotatable about said main shaft, said reverse gear means having a clutch face on one side;
forward gear means freely rotatable about said main shaft, said forward gear means having a clutch face on one side, with said clutch faces facing each other;
a drive gear meshed with said reverse and forward gear means for driving said reverse and forward gear means in respectively opposite directions of rotation;
a sleeve member mounted on said main shaft between said reverse and forward gear means, said sleeve member having
a clutch face at each end, each clutch face selectively engagable with one of said clutch faces of said reverse and forward gear means, and an exterior circumferential groove in said sleeve member between said clutch faces;

yoke means for engaging said groove and moving said sleeve member along said main shaft;

cam means operatively associated with said yoke means;

actuating means for actuating said cam means into engagement with said reverse gear means to actuate said yoke means and drive said sleeve member out of engagement with said reverse gear means and into engagement with said forward gear means to provide a forward position, and for actuating said cam means into engagement with said forward gear means to actuate said yoke means and drive said sleeve member out of engagement with said forward gear means and into engagement with said reverse gear means to provide a reverse position, said actuating means having a neutral position between said forward and reverse positions with said sleeve member between and disengaging said forward and reverse gear means;

a detent canister assembly comprising a self contained modular unit mounted in said housing and comprising a cylindrical canister containing a ball spring biased into engagement with said actuating means to center the latter in said neutral position.

13. The invention according to claim 12 wherein:

said cylindrical canister extends axially left-right and has a left end wall with an aperture therethrough and has an open right end;

said assembly includes a first spring extending axially through said aperature in said left end wall of said cylindrical canister, said first spring having a left end bearing against said housing and having a right end bearing against said ball;

said assembly includes a second spring extending axially within said canister and concentric to said first spring, said second spring having a left end bearing against said left end wall of said canister and having a right end bearing against said ball, such that axial leftward depression of said ball within said canister by said actuating means compresses said first spring and also moves said canister axially leftwardly until said left end wall of said canister strikes said housing stopping leftward movement of said canister, whereafter both said first and second springs are compressed during further leftward depression of said ball.

14. The invention according to claim 13 wherein said actuating means comprises:

a rotary shaft connected to said cam means and extending parallel to said main shaft;

a lever arm non-rotatably mounted to said second mentioned shaft by a transverse set screw extending through a step reduced diametered aperture in said lever arm transverse to the axis of rotation of said second shaft, said step reduced diametered aperture having a smaller inner diameter receiving said set screw and having a larger outer diameter receiving said ball in said neutral position and forming an outer shoulder past which said ball must be slidingly depressed to rotate said lever arm and second shaft to said forward or reverse positions.

* * * * *